(12) United States Patent
Ishii

(10) Patent No.: US 8,730,398 B2
(45) Date of Patent: May 20, 2014

(54) VIDEO OUTPUT APPARATUS AND CONTROL METHOD THEREFOR, AND NON-TRANSITORY RECORDING (STORING) MEDIUM THAT RECORDS PROGRAM

(71) Applicant: Canon Kabushiki Kaisha, Tokyo (JP)

(72) Inventor: Atsushi Ishii, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/677,415

(22) Filed: Nov. 15, 2012

(65) Prior Publication Data

US 2013/0128117 A1     May 23, 2013

(30) Foreign Application Priority Data

Nov. 17, 2011   (JP) .................................. 2011-251638

(51) Int. Cl.
*H04N 9/74*        (2006.01)

(52) U.S. Cl.
USPC ............................ 348/584; 348/588; 348/598

(58) Field of Classification Search
USPC ................. 348/584, 588, 598, 599, 521, 500, 348/563–565, 567, 589, 600
IPC .................... H04N 5/445,9/74, 5/04, 5/06, 9/76
See application file for complete search history.

(56) References Cited

U.S. PATENT DOCUMENTS 5,986,717 A * 11/1999 Fairhurst ....................... 348/584
6,956,618 B2 * 10/2005 Takatori ....................... 348/588

FOREIGN PATENT DOCUMENTS

JP          2007271848 A     10/2007

* cited by examiner

*Primary Examiner* — Sherrie Hsia
(74) *Attorney, Agent, or Firm* — Rossi, Kimms & McDowell LLP

(57) ABSTRACT

This video output apparatus includes a plurality of input units that input a plurality of video signals and an auxiliary information related to video shot-changes that are associated with the video signals. A composing unit stores the image data associated with the plurality of input video signals in an image memory and reads out image data at a predetermined timing, and outputs a composed video signal. A control unit obtains auxiliary information for each video signal and selects one video signal from among the plurality of video signals by comparing priority orders corresponding to the auxiliary information. The control unit carries out control in which the frame frequency of the video signal that the composition unit outputs by reading out the image data from the image memory is synchronized with the frame frequency of the selected video signal.

8 Claims, 4 Drawing Sheets

FIG. 3
| Condition | Priority order |
|---|---|
| Frame lock not possible | 0 |
| IT Contents Type = "Photo" | 1 |
| IT Contents Type = "Graphics" | 2 |
| No IT Contents Type | 3 |
| IT Contents Type = "Cinema" | 4 |
| IT Contents Type = "Game" | 5 |
FIG. 4A
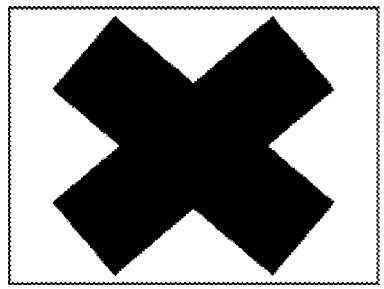
FIG. 4B
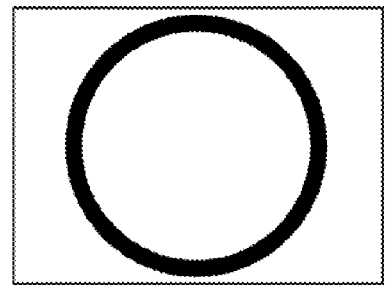
FIG. 4C
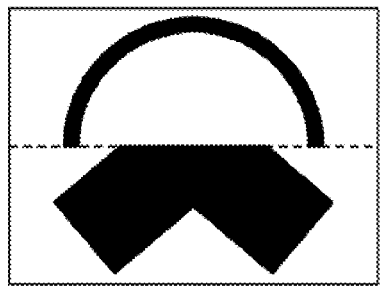

VIDEO OUTPUT APPARATUS AND CONTROL METHOD THEREFOR, AND NON-TRANSITORY RECORDING (STORING) MEDIUM THAT RECORDS PROGRAM

BACKGROUND OF THE INVENTION

1. Field of the Invention

The present invention relates to a control technology that outputs a video signal based on auxiliary information associated with the video shot-change.

2. Description of the Related Art

Conventionally, in a display apparatus and a video processing apparatus, for various purposes, image data associated with an input video signal is stored in a frame memory, and a video signal is output or displayed by reading out data from this memory. In this context, when a video signal is read out asynchronously to the frame frequency of the input video signal, there are cases in which the information of different frame images mixes in one frame. In the case in which a video changes significantly between different frames, development in which what appear to be vertical bands are visible (what is termed "tearing") occurs in the video, and this becomes a hindrance to viewing. Here, tearing will be explained with reference to FIG. 4A to FIG. 4C. FIG. 4A shows an example of a frame image of an input video signal, and FIG. 4B shows an example of a frame image of a video signal that is input after FIG. 4A. In addition, FIG. 4C shows an example of an image of data wherein data of the frame image of FIG. 4B has been read out from the frame memory while the data of the frame image of FIG. 4A is being written to the frame memory. The upper half portion of the image in FIG. 4B is rendered in the upper portion, where the broken line serves as a boundary, and the lower half portion of the image in FIG. 4A, which is the preceding frame image, is rendered in the lower portion. In this manner, development in which a boundary at which images of different frames are rendered is produced is tearing, and this is caused by the data of the temporally adjacent frame images being read out asynchronously to the frame frequency, as shown in FIG. 4C.

For this state, a technology is known in which the occurrence of tearing is prevented by synchronizing the reading out of the image data with the frame frequency of the input video signal by suitably adjusting the phase. Specifically, a technology (below, referred to as "frame lock") has been implemented in which frame image data is read out after being synchronized with a vertical synchronizing signal of the video signal. In addition, a technology (what is termed "double buffering") is known in which the timing of the writing and reading of a plurality of image data with respect to frame memory is suitably controlled. In the later technology, although tearing can be suppressed, suppressing the number of times that each frame image is read out from being different or the presence of unread frames is difficult.

In addition, from a different point of view, a technology has been implemented in which a plurality of image data is composed and output or displayed. Here, an example of the composition of image data will be explained with reference to FIG. 5. Images A and B shown in FIG. 5 show examples of images associated with video signals before syntheses, and images C and D each show examples of an images that is output or displayed after composition. Image C exemplifies a configuration (called, for example, "side by side" and the like) in which images A and B are arranged side by side in a horizontal direction. In addition, image D exemplifies a configuration (called, for example, "picture in picture" and the like) in which image A is rendered in a main screen and image B is rendered in a sub-screen. In addition to these, composing processing associated with video signals is implemented in various combinations. For example, in a display apparatus, a manner of use in which a television program is displayed in a sub-screen while displaying a working screen in a computer device, becomes possible, and thus, the usability for a user is improved. However, in the case of composing processing of image data, even if frame locking is carried out on any of the video signals, there is a condition in which suppressing the occurrence of tearing is difficult at a portion at which the data associated with other video signals has been composed. Laid Open Unexamined Japanese Patent Application 2007-271848 discloses a method in which, in a video output apparatus that generates and outputs a single display video based on a plurality of input videos, a frame frequency of the output video is selected from among the input video and set according to predetermined selection rules.

Laid open Japanese Patent Application No. 2007-271848 discloses a method in which a video signal that is an object of synchronization is directly selected by the user. However, in this case, because a user must have suitable knowledge, there is a possibility that the most suitable function is not effectively utilized or that the operation is laborious for the user. In addition, Laid Open Japanese Patent Application No. 2007-271848 also shows a method in which an input video signal, in which the area of the displayed image is large, is made a synchronized object with priority, but this selection rule has no relation to the possibility that tearing may occur. Thus, in the case in which tearing has occurred, there is a concern that the viewing of the user may be hindered. In addition, a method is disclosed in which the input video signal for which the illumination change of the video content between frames is largest is set as the synchronization object. In this method, when the video signal that is to be made a synchronization object cannot be selected unless a shot-change in the video content has occurred, a video signal that should be made the synchronization object cannot be selected, and thus, there is a possibility that the influence on an image due to a deterioration such as tearing will be viewed by the user. Furthermore, a processing load is applied because processing in which the shot-changes in the video content is measured is necessary.

SUMMARY OF THE INVENTION

Thus, the present invention provides a video output apparatus that suppresses the generation of tearing and advantageously increases the performance of synchronization control, a control method therefor, and a storage medium that stores a program.

An apparatus according to the present invention is a video output apparatus that can carry out a composing processing of a plurality of video signals and output the composed video signal, comprising a plurality of input units that input the plurality of video signals and auxiliary information for these signals; a composition unit that stores a plurality of video signals that have been input into the plurality of input units in a storage unit, reads out the plurality of video signals from the storage unit, and composes the plurality of video signals; and a control unit that selects one video signal from among the plurality of video signals by comparing a priority order corresponding to the auxiliary information for the plurality of video signals that has been input to the plurality of input units, and carries out synchronization control in which a frame frequency of the video signals that the composition device reads out from the storage unit are synchronized with the frame frequency of the selected video signal.

In addition, a method according to the present invention is a control method that is executed on a video output apparatus that can carry out the composing processing of a plurality of video signals and that can output the composed video signal, comprising inputting a plurality of video signals and an auxiliary information for the video signals; storing the plurality of video signals that have been input in a storage unit; obtaining the auxiliary information for the plurality of video signals that have been input and comparing the priority orders corresponding to the auxiliary information; selecting one video signal from among the plurality of video signals by comparing the priority orders and synchronizing a frame frequency of the video signals that have been read out from the storage unit with the frame frequency of the video signal that has been selected; and outputting a video signal that has been read out at a frame frequency that has been synchronized.

In addition, a medium according to the present invention is a non-transitory recording (storing) medium that records a computer-readable program that is executed on a video output apparatus that can carry out composing processing of a plurality of video signals and output a composed video signal, comprising inputting a plurality of video signals and an auxiliary information for the video signals; storing the plurality of video signals that have been input in a storage unit; obtaining the auxiliary information for the plurality of video signals that have been input and comparing the priority orders corresponding to the auxiliary information; selecting one video signal from among the plurality of video signals by comparing the priority orders and synchronizing a frame frequency of the video signals that have been read out from the storage unit with the frame frequency of the video signal that has been selected; and outputting a video signal that has been read out at a frame frequency that has been synchronized.

According to the present invention, a video output apparatus advantageous in increasing the performance of synchronization control that suppresses the occurrence of tearing, a control method therefor, and a non-transitory recording (storing) medium that records a program can be provided.

Further features of the present invention will become apparent from the following description of exemplary embodiments with reference to the attached drawings.

BRIEF DESCRIPTION OF THE DRAWINGS

FIG. 3 is a diagram for explaining the computation process for priority orders.

FIGS. 4A to 4C are drawings for explaining tearing.

DESCRIPTION OF THE EMBODIMENT

Below, an embodiment of the present invention will be explained with reference to the figures. Note that the present invention can be applied to either of a video device having a built-in display apparatus or a video device that does not have a built-in display apparatus and outputs a video signal to an external display apparatus. For example, the video output apparatus according to the present invention can be applied to a display apparatus and a replay apparatus such as a projector, a liquid crystal display, a television apparatus, a DVD (Digital Versatile Disk) recorder, and a frame synchronizer and the like.

Figure 1A:
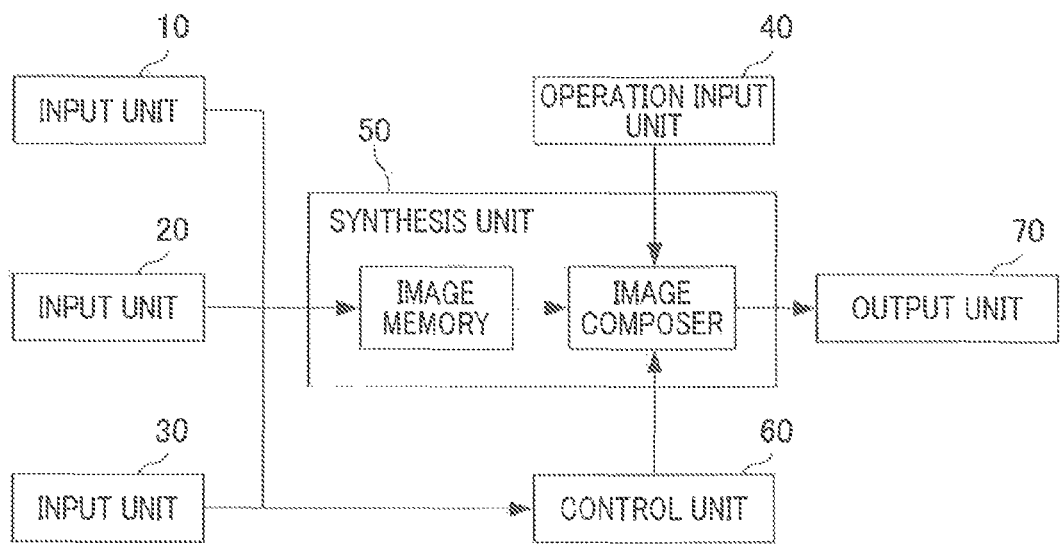
FIGS. 1A and 1B are block diagrams that show an example of the configuration of a video output apparatus and a control unit.
Figure 1B:
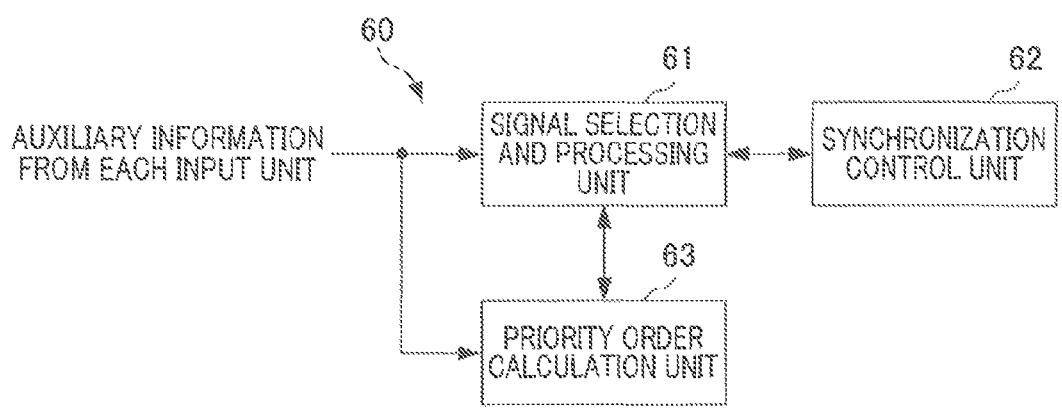

FIGS. 1A and 1B show an example of the configuration of a video output apparatus which is an embodiment of the present invention, where FIG. 1A shows an overall schematic configuration and FIG. 1B shows an example of a configuration of a control unit 60.

In FIG. 1A, video signals and auxiliary information are each input to a plurality of input units 10, 20, and 30. The video signals are signals that include image information, and the auxiliary information is information associated with the video shot-changes and includes meta-information, which is information other than image information, and the like. In other words, the auxiliary information includes information for identifying the content of the image or type of the image. The input units 10, 20, and 30 receive video signals based on HDMI standards from a video device (not illustrated). HDMI is an abbreviation for "High-Definition Multimedia Interface", and the HDMI standard is a global standard for communication interfaces that transmit video and audio by digital signals. For example, video signals such as 480p (720×480p) and 1030p (1920×1080p) and the like are input into each of the input units ("p" denotes "progressive"). In addition, InfoFrame packets that are determined by CEA-861-D, such as AVI InfoFrame and SPD InfoFrame, are input to each input unit as auxiliary information. Note that AVI is an abbreviation for "Auxiliary Image information" and SPD is an abbreviation for "Source Product Description".

Figure 5:
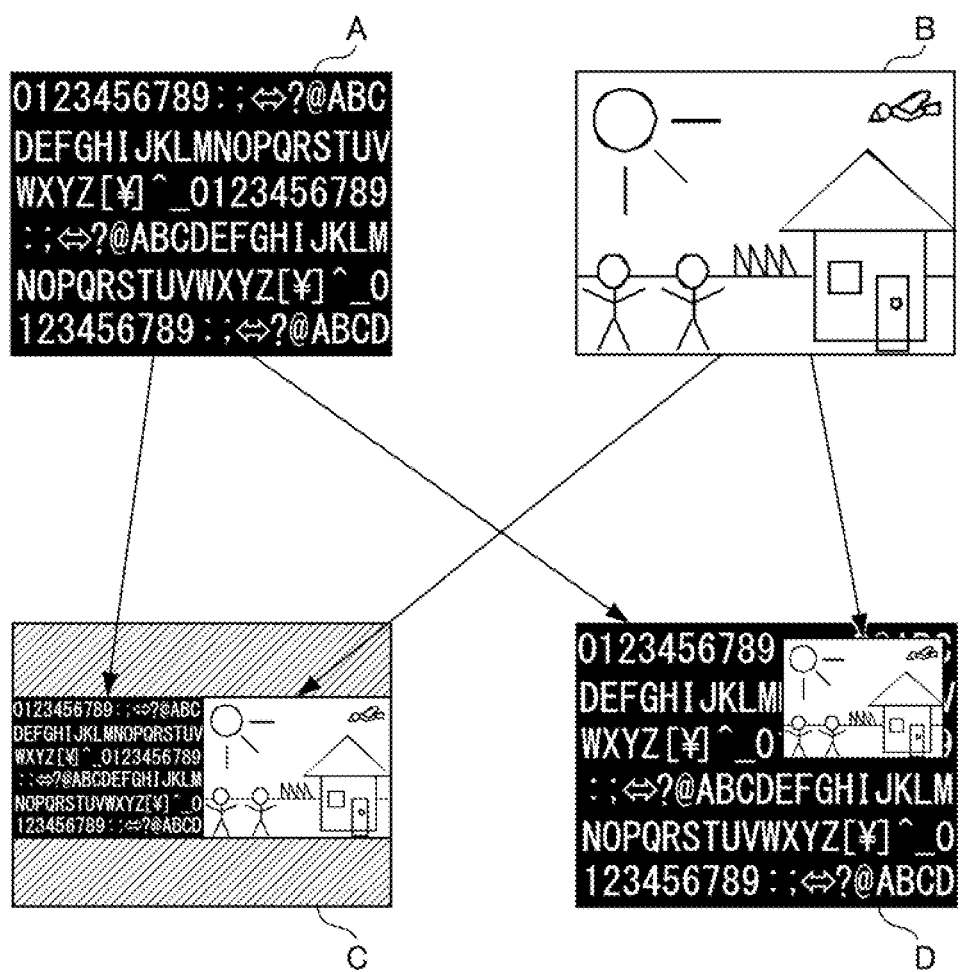
FIG. 5 is a drawing that shows an example of the composition of video signals.

The video signals that have been input into the input units 10, 20, and 30 are output to a composing unit 50 via a decoder (not illustrated), and composing processing of the image data is carried out. The composing unit 50 temporarily stores a plurality of image data in an image memory, reads out data from the image memory at a prescribed timing according to a command from a control unit 60 described below, and sends the composed video signal to an output unit 70. The output unit 70 outputs the video signal to a display apparatus (not illustrated) in a prescribed format. An operation input unit 40 sends a desired operation command made by a user to the composing unit 50. The composing unit 50 switches the read-out timings of the plurality of image data based on the operation input related to a composition setting that has been input from the operation input unit 40, and carries out the composing processing associated with the plurality of video signals (refer to FIG. 5).

The control unit 60 obtains the auxiliary information related to the video signal from the input units 10, 20, and 30, and outputs a control signal so the composing unit 50 after carrying out the processing described below. The control unit 60 controls the determination of the video signal for frame lock control processing, the calculation and comparison of priority order, and the synchronization processing and the like. These controls are realized by interpreting and executing a prescribed program when the control unit 60 is provided with a CPU (Central Processing Unit). In addition, as shown in FIG. 1B, in the case in which the control unit 60 includes a signal selection and processing unit 61, a synchronization control unit 62, and a priority order calculating unit 63, each of the following controls is carried out.

First, the signal selection and processing unit 61 obtains the auxiliary information for the video signals that have been input to each of the input units 10, 20, and 30. The signal selection and processing unit 61 evaluates with which video signal among the plurality of video signals to synchronize the frame frequency of the video signal composed by the composing unit 50, and determines the video signal that is used in frame locking. The synchronizing unit 62 carries out frame locking by carrying out control such that the video output signal from the composing unit 50 to the output unit 70 is synchronized with the determined video signal based on the input of the vertical synchronization signal of the video signal that has been determined by the signal selection and processing unit 61. The priority order calculating unit 63 calculates the priority order of the video signals based on the packet information (InfoFrame packet) that is input as auxiliary information. This is necessary for the signal selection and processing unit 61 to select a particular video signal from among a plurality of video signals by using the information about the priority order. The calculation processing for priority order will be described in detail below.

Figure 2:
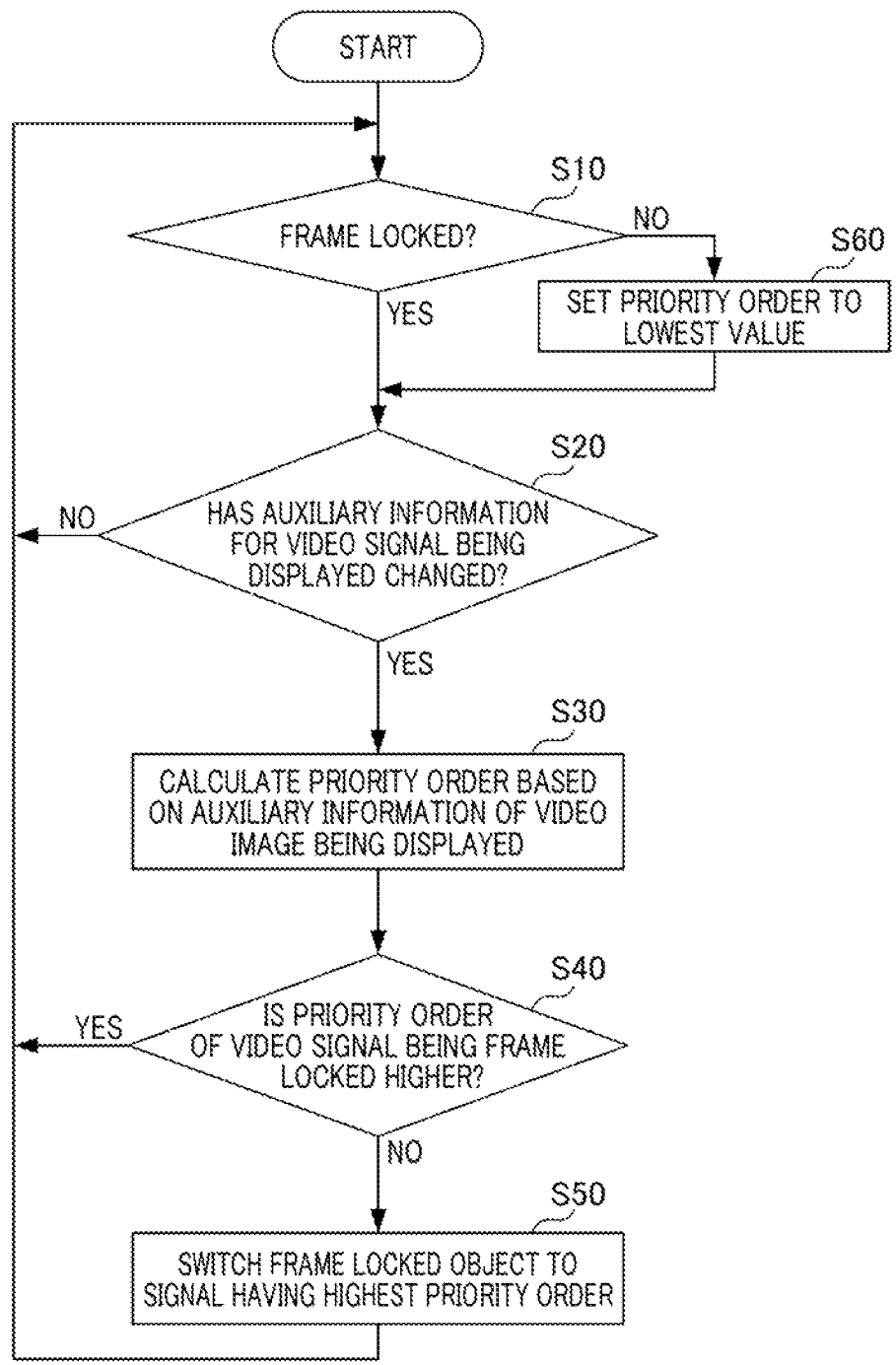
FIG. 2 is a flowchart that exemplifies the flow of the frame lock control processing.

The flowchart in FIG. 2 illustrates the flow of frame lock control processing based on auxiliary information. The processing shown below is realized by a control unit 60 having a CPU executing a computer-readable program.

When the processing starts, in step S10, the control unit 60 determines whether or not a particular video signal is frame locked at the present time. In the case in which the video signal is frame locked, the processing proceeds to step S20, and in the case in which the video signal is not frame locked, the processing proceeds to step S60.

In step S20, the control unit 60 obtains the InfoFrame packets, which serve as auxiliary information, from the input units 10, 20, and 30, and determines whether or not the auxiliary information related to the priority order has changed for each input video signal before composition according to the video being output or displayed. Here, the information related to the priority order is set to a predetermined value in the case in which the composing processing method in the composition unit 50 has been changed by an instruction signal from the operation input unit 40, in the case in which the video signal is intermittent, or in the case in which auxiliary information has been input the first time. As this value, a virtual value that cannot actually be taken is appended for the initial value of the auxiliary information. In the case in which the control unit 60 has determined that the auxiliary information of the video signal associated with the image being displayed has not changed, the processing returns to step S10, and in the case in which it has been determined that the auxiliary information has changed, the processing proceeds to step S30.

In step S30, the control unit 60 calculates the priority order of each video signal according to the auxiliary information from the input units 10, 20, and 30, and then the processing proceeds to step S40. The calculation method for the priority order will be explained below. In step S40, the control unit 60 compares the priority order associated with the video signal that is frame locked at the present time and the priority orders associated with the other video signals. As a result, in the case in which the priority order associated with the video signal being frame locked is higher than the priority orders associated with the other video signals, the processing returns to step S10 without carrying out any processing. In the case in which the priority order associated with the video signal that is being frame locked is equal to the priority order associated with the other signals, the control unit 60 maintains as-is the current video signal without changing the synchronization object, and the processing returns to step S10. In addition, in the case in which the priority order associated with the video signal being frame locked is lower than the priority orders associated with the other video signals, the processing proceeds to step S50. Note that in step S10, in the case in which a frame lock is originally not being carried out, in step S60, the control unit 60 treats a signal (virtual signal) having the lowest priority order as being locked. Specifically, in the case in which a video signal that can be frame locked had not been input immediately before and the like, frame locking is not actually possible, but the processing can be unified because this state can be included in one of the priority orders by treating this state as one that is being pseudo-locked. Then the processing proceeds to step S20.

In step S50, the control unit 60 sets the video signal having the highest priority order as the video signal used in frame lock control, and controls the composing unit 50 to synchronize the video output from the composing unit 50 to the output unit 70 with the frame frequency of the selected video signal. In addition, after the setting has been completed, the processing continues by returning to step S10.

Next, the priority order computation processing that is carried out by the control unit 60 and is based on the auxiliary information will be explained in detail. In the present embodiment, the priority order is represented by a numerical value, and the higher the numerical value, the higher the priority. In addition, in the video output apparatus of the present embodiment, the priority ordering is carried out based on the information for the IT Content Type of the AVI InfoFrame of the InfoFrame packet that has been input as auxiliary information. This IT Contents Type is information that shows the properties of the video signal, and includes four types of information as the type information for a video: "Graphics", "Photo", "Cinema", and "Game". FIG. 3 shows an example of the priority order using a table, and the priority order corresponding to the auxiliary information is determined for each video signal by the control unit 60 referring to this information. The first column of FIG. 3 shows conditions, and the second column shows the priority order by a numerical value for the case in which these conditions are satisfied. Here, for the priority order of each item of information for IT Contents Type, "Game", for which the shot-changes in video content are extreme, is set to the highest at 5. "Cinema", which is next, is set to 4. In addition, in the case in which information for InfoFrame cannot be obtained, the priority order cannot be determined, and thus the priority order is defined as 3. "Graphics" has a priority order that is set to 2, and "Photo" has a priority order that is set to 1. In addition to these definitions, for the case in which there is no input video signal and the case in which frame lock is not possible because the frame frequency is too high and the like, a virtual priority order is defined as a default value 0. The control unit 60 carries out synchronization control by finding the priority order according to the above rules.

In this manner, the video input apparatus of the present embodiment freely selects a video having a high priority based on the auxiliary information associated with the video shot-change, and frame lock control can be implemented with a superior responsiveness without requiring an analysis of the video signal.

As explained above, according to the present embodiment, an video output apparatus advantageous in increasing the performance of frame lock control in which the occurrence of tearing is suppressed, a control method therefor, and a program can be provided.

SECOND EMBODIMENT

In the previous embodiment, an example of the calculation of the priority order was explained based on the IT Contents Type of the AVI InfoFrame. However, the priority order may also be calculated based on auxiliary information that is superimposed on the information (type of source device and the like) of the SPD InfoFrame and the VBI (vertical blanking interval). In addition, in the previous embodiment, the case was explained in which the priority order is calculated based only on auxiliary information. This is not limiting, and information other than auxiliary information, for example, information that shows the signal format of a video signal, or information that shows weightings in the case in which a weighting has been applied in advance for each input unit, can be used. In addition, the information that can be used as auxiliary information may be information that shows whether the video signal is a playing or stopped, or may be information that shows the speed of the movement of the video.

In the embodiment, an example was explained in which frame lock control is carried out by maintaining the video signal during frame lock in the case in which the priority order associated with the video signal during frame lock is equal to the priority order of any of the other video signals. However, only in this case, a configuration may be used in which a more detailed calculation is carried out by referring to and comparing other auxiliary information and the like that is not normally used in the calculation of the priority order.

In Step S20 in FIG. 2, the case was explained in which periodic determination is carried out by performing change detection in the auxiliary information by pooling. However, the change detection of auxiliary information may be carried out based on information such as interrupts and the like, or may be carried out using only a timing at which the state of a video signal changes.

OTHER EMBODIMENTS

The present invention can also be realized by executing the following process. Specifically, this is a process in which software (a program) that realizes the functions of the embodiment described above is provided to a system or apparatus via a network or any type of non-transitory recording (storing) media, and a computer (or CPU or MPU and the like) in this system or apparatus reads out and executes the program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a non-transitory recording (storing) medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251638 filed Nov. 17, 2011 which is hereby incorporated by reference herein its entirety.

What is claimed is:

1. A video output apparatus that can carry out a composing processing of a plurality of video signals and output the composed video signal, the apparatus comprising:
   a plurality of input units that input the plurality of video signals and an auxiliary information for the video signals;
   a composition unit that stores the plurality of video signals that have been input to the plurality of input units in a storage unit, reads out the plurality of video signals from the storage unit, and composes the plurality of video signals; and
   a control unit that selects one video signal from among the plurality of video signals by comparing a priority orders corresponding to the auxiliary information of the plurality of video signals that have been input to the plurality of input units, and carries out synchronization control in which a frame frequency of the video signals that the composition unit has read out from the storage unit is synchronized with the frame frequency of the selected video signal.

2. The video output apparatus according to claim 1, wherein the control unit obtains the priority orders that have been set in advance for the auxiliary information for each of the plurality of video signals, and selects the video signal having the priority order that is higher than those of the other video signals by comparing the priority orders of the plurality of video signals.

3. The video output apparatus according to claim 2, wherein the control unit carries out synchronization control by using the video signal already selected in a case in which there is a video signal having a priority order that is the same as that of the video signal already selected.

4. The video output apparatus according to claim 1, wherein, in the case in which any of the auxiliary information of the plurality of video signals has changed after carrying out the synchronization control, the control unit obtains the priority orders corresponding to auxiliary information that has changed and again selects the video signal having a priority order that is higher than the other video signals by comparing the priority orders of the plurality of video signals.

5. The video output apparatus according to claim 1, wherein the auxiliary information is information that includes one or more among packet information that includes a type information for the video of the video signal and information that is superimposed on a vertical blanking interval of the video signal.

6. The video output apparatus according to claim 1, wherein the auxiliary information includes information that indicates whether the video of the video signal is either of a stopped video or a moving video.

7. A control method that is executed on a video output apparatus that can carry out syntheses processing of a plurality of video signals and output a composed video signal, the method comprising:
   inputting the plurality of video signals and an auxiliary information for the video signals;
   storing the plurality of video signals that have been input in a storage unit;
   obtaining the auxiliary information for the plurality of video signals that have been input and comparing the priority orders corresponding to the auxiliary information;
   selecting one video signal from among the plurality of video signals by comparing the priority orders and synchronizing a frame frequency of the video signals that have been read out from the storage unit with the frame frequency of the video signal that has been selected; and outputting a video signal that has been read out at a frame frequency that has been synchronized.

8. A non-transitory recording medium that records a computer-readable program that is executed on a video output apparatus that can carry out composing processing of a plurality of video signals and output a composed video signal, the medium comprising:

inputting a plurality of video signals and an auxiliary information for the video signals;

storing the plurality of video signals that have been input in a storage unit;

obtaining the auxiliary information for the plurality of video signals that have been input and comparing the priority orders corresponding to the auxiliary information;

selecting one video signal from among the plurality of video signals by comparing the priority orders and synchronizing a frame frequency of the video signals that have been read out from the storage unit with the frame frequency of the video signal that has been selected; and outputting a video signal that has been read out at a frame frequency that has been synchronized.

* * * * *